Figure 1:
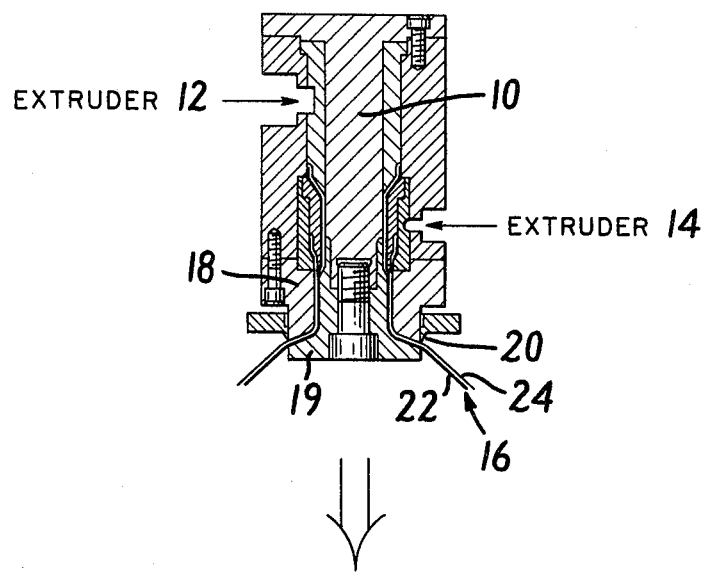
Figure 1:
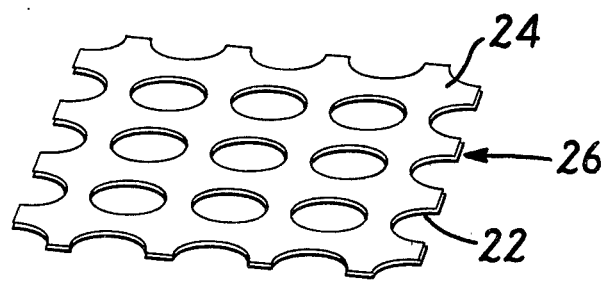
Figure 1:
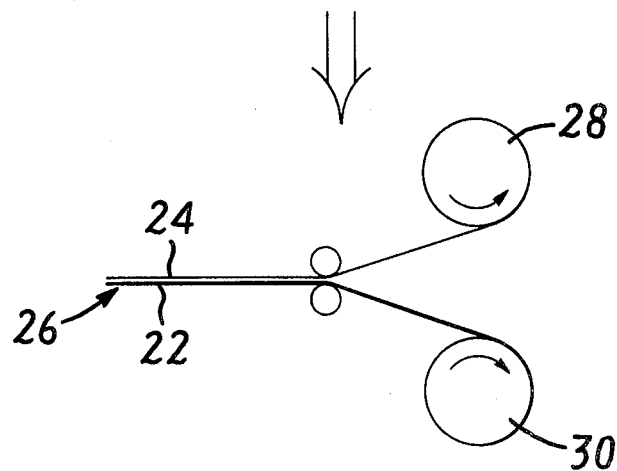

United States Patent [19]

Fair et al.

[11] 4,410,587
[45] Oct. 18, 1983

[54] CO-EXTRUDED FUSIBLE NET

[75] Inventors: Timothy K. Fair, Blaine; Richard C. Mudge, Minneapolis, both of Minn.

[73] Assignee: Conwed Corporation, St. Paul, Minn.

[21] Appl. No.: 395,585

[22] Filed: Jul. 6, 1982

[51] Int. Cl.³ .............................................. B32B 7/00
[52] U.S. Cl. .............................. 428/247; 156/244.11; 156/344; 264/167; 264/171; 428/105; 428/110; 428/255
[58] Field of Search .............................. 428/247, 255; 156/244.11, 344; 264/167, 171

[56] References Cited

U.S. PATENT DOCUMENTS

| 2,919,467 | 1/1960 | Mercer | 428/255 |
| 3,252,181 | 5/1966 | Hureau | 156/500 |
| 4,038,008 | 7/1977 | Larsen | 164/167 |
| 4,144,368 | 3/1979 | Kim et al. | 428/255 |
| 4,348,444 | 9/1982 | Craig | 428/255 |

Primary Examiner—James J. Bell
Attorney, Agent, or Firm—Eyre, Mann, Lucas & Just

[57] ABSTRACT

An improved method of manufacturing fusible net products and the products resulting therefrom are disclosed. Low-melt-strength polymers are extruded with a stable high-melt-strength polymer to form a composite net structure having a carrier net layer of the stable high-melt-strength polymer carrying a net layer of similar structure and of the low-melt-strength polymer. After the molten layers are quenched and solidified the net layer on the carrier is easily delaminated. The net layer can be removed anytime after the material ceases to be tacky and may be conveniently stored as a composite if desired. The carrier polymer net is available for sale directly as is or it may be oriented or ground and recycled to again form the carrier. The low-melt-strength polymer may be sandwiched between outer layers of high-melt-strength polymer or the low-melt-strength polymer may be carried on both sides of the high-melt-strength polymer.

16 Claims, 2 Drawing Figures

CO-EXTRUSION DIE

TRI-EXTRUSION DIE

CO-EXTRUDED FUSIBLE NET

The invention relates to the manufacture of net products and particularly to an improved method for manufacturing fusible net products. It particularly relates to a method of manufacturing a light-weight fusible net and the product manufactured therefrom.

Methods for extruding net products are well known. For instance, U.S. Pat. No. 4,038,008 to Larsen shows an apparatus for making a tubular net by continuous extrusion. In this patent, the extrusion opening is sequentially interrupted by a plurality of striker teeth so as to produce openings in the extruded film.

A significant problem in the manufacture of light-weight fusible nets is that the resin material, for example, polyamide resin is of low-melt-strength so that it cannot be successfully extruded below the range of 10 to 15 PMSF and heretofore the manufacture of these lighter-weight nets has not been adaptable to the extrusion process.

Again, while the extrusion process works very well for the extrusion of non-polar polyolefins such as polypropylene, other resins which are polar such as the polyamides, tend to stick to the extrusion die.

Light-weight fusible net products are being used in greater and greater quantities as fusible adhesive for heat bonding of fabric to fabric, fiberglass to foam, or in such cases as vinyl to foam for use as automobile upholstery and the like. For such uses, the extruded fusible net product has much greater uniformity than a spunbonded product and much greater strength than a cast web product, but has heretofore been unavailable in the light-weights appropriate to such end uses.

In order to achieve a light-weight fusible web product suitable for such uses, in one known method a polyamide material has been spunbonded to form a web of overlapped strands. It will be appreciated that in such a technique, there is little control of the positioning of the web strands and as a consequence, the spunbonded web can have large breaks and areas where there are significantly greater bunchings of strands.

In order to overcome the non-uniformity of such a manufacturing technique, in another technique such fusible resins have been cast onto a release paper on which the cast net is stored prior to its end use. The increasing volumes of fusible net materials being handled have created a handling problem for the end users. The release paper has not been found to be economically recyclable so that it has been found necessary simply to discard huge quantities of release paper. Since the paper is very expensive as well, it is highly desirable that an alternate method be found.

In accordance with the invention herein, it has been found that low-melt-strength polymers can be co-extruded with a stable high-melt-strength polymer, such as polypropylene to form a composite net structure having a carrier net layer of stable high-melt-strength polymer carrying a net layer of similar structure and of low-melt-strength polymer. Composite net structures formed by coextrusion are well-known in the art; however, the composite formed is normally bonded during the co-extrusion process so as to form an inseparable composite structure of the resins. In accordance with the invention taught herein, however, the two different polymers are weakly bonded together and the laminar flow of polymers through the co-extrusion die is such that the two layers are separable. It will be appreciated that the low-melt-strength layer can be made very lightweight since its structure is supported by the strength of the stable high-melt-strength material on which it is being carried.

After the molten layers are quenched and solidified, the net layer on the carrier is easily delaminated from the stable carrier layer. The net layer can be removed as soon as the material ceases to be tacky or it may be conveniently stored as a composite for a length of time until it is desired that it be removed from the stable carrier net either in-plant or at an end user.

It will be appreciated that a light-weight uniform product of low melt strength is obtained by this process. The extrusion, as brought out above, also results in a more uniform, higher-strength net product than that which has been achieved by the spunbonded and casting processes. Finally, and of equally great significance, is the fact that the stable carrier polymer is available for sale as an extruded product directly as is; it may be oriented either uniaxially or biaxially in known manner and sold as an oriented net product; or, it may be ground and recycled to form the carrier in further iterations of the disclosed process. It will be appreciated that with any of these alternatives, a substantial improvement in all aspects of the fusible net product is achieved.

In another embodiment of the process in accordance with the invention, a composite formed of a net layer of the low-melt-strength polymer is sandwiched between outer layers of the more stable polymer material as each emerge from a three layer die. In this embodiment, the outer layers of stable polymer will receive any of the imperfections due to, for example, the dragging imparted by the striker teeth and such like. Also, the encapsulation of the low-melt-strength polymer will reduce its tendency to stick to the metal die parts.

Figure 2:
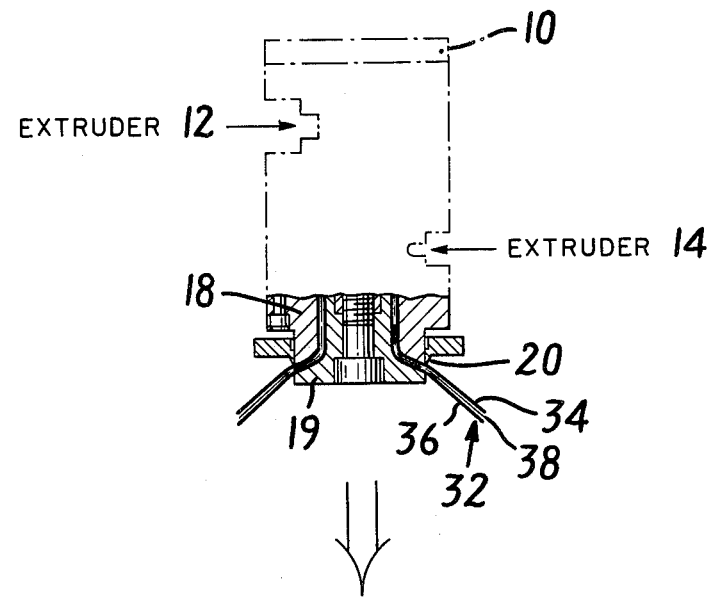
Figure 2:
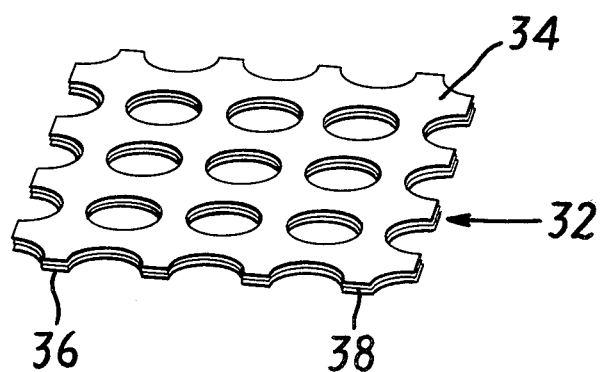
Figure 2:
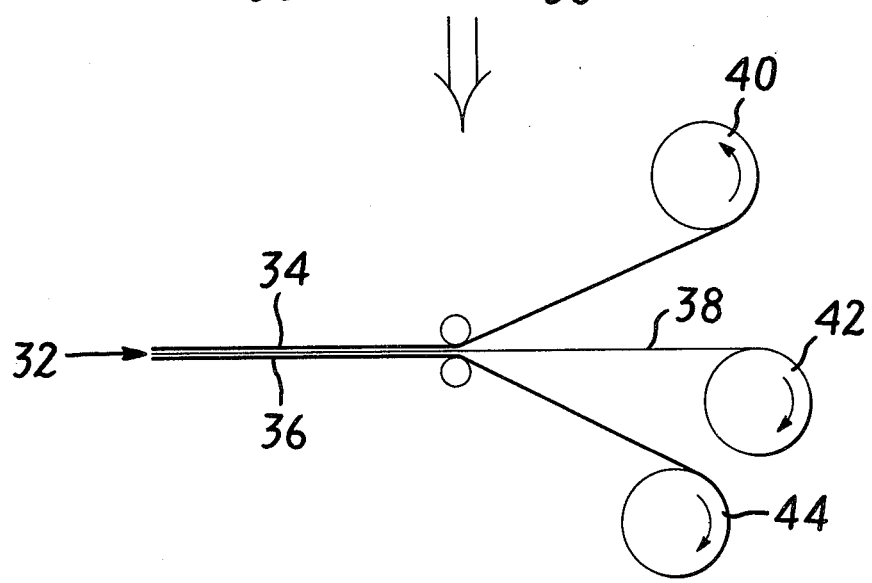

Further features and advantages of the invention will be seen in conjunction with the figures wherein:

FIG. 1 is a schematic illustration of a co-extrusion process for forming a net in accordance with the invention; and FIG. 2 shows schematically an alternate tri-extrusion process in accordance with the invention.

In FIG. 1, an annular co-extrusion die 10 of conventional type is shown in schematic form. Such extrusion devices are well-known in the art and will not be described further herein. In the co-extrusion process, two separate sources 12 and 14 of polymer materials are maintained under pressure in an extruder and material from each is forced past the lips of the die 10 to form a composite film 16.

A net product is typically formed by interrupting the flow of resin through the upper die lip 18 and lower die lip 19 by repetitive insertion and withdrawal of a plurality of striker teeth between the die lips. Such teeth are only indicated at 20. In accordance with the invention, one of the polymers is a relatively stable, high-melt-strength polymer, which may be chosen from the group of polyolefin resins. These resins include polypropylene, high-density polyethylene, low-density polyethylene, linear-low-density polyethylene and co-polymers of this group. A preferred resin is low-density polyethylene. A more preferred high-melt-strength polymer is polypropylene. The second polymer material is chosen from those polymers which will only weakly bond to the chosen high-melt-strength polymer. Low-melt-strength polymers suitable for use in the method in accordance with the invention may be chosen from the group comprising polyamides, polycaprolactones, polyesters and co-polymers of this group. It will be appreciated that the invention is not limited to these groups of polymers and that there exists a considerable number of polymers which will weakly bond to a polyolefin, and in particular to polypropylene. A low-melt-strength polymer is one which will not consistently hold together, i.e. maintain a high degree of light weight dimensional integrity when used by itself in a netting extrusion process. In contrast a high-melt-strength polymer is one which will form a good net by itself in a netting extrusion process such as that disclosed in U.S. Pat. No. 3,252,181. For further discussion the use of polypropylene and polyamide resins will be assumed.

As the composite net 16 in accordance with the invention moves away from the die lips 18 and 19, the composite 16 comprises a lower carrier layer 22 of polypropylene having a relatively thinner net layer 35 of polyamide resin being carried thereon. It will be appreciated that the thickness of the layers illustrated in FIG. 1 are exaggerated to show the relative thickness of the layers.

For best results, the lower layer 22 is the relatively thicker net structure of the higher-melt-strength polymer which is easily extruded from the die 10 and the polar low-melt-strength layer will be the top layer so that the polar resin will make a larger angle with respect to the upper lip in contrast to the lower lip of the die to avoid problems with its sticking to the upper die lip.

As the tube of net material moves away from the die 10, it is slit in conventional manner to form a flat net illustrated at 26. The composite net 26 including both layers is conveyed in any suitable conventional manner to be wound on separate rolls 28 and 30 which serve as takeup for the two layers of the composite flat net 26. The layer 24 is easily delaminated from the carrier layer 22 by the force imparted by layer 24 being wound onto roller 28 while the lower layer or carrier layer 22 is wound onto roller 30. This delamination step can be either in-line with the extruders or off-line as a secondary operation.

As mentioned previously, the polypropylene net layer 22 may be sold as is, oriented further and sold, or simply recycled to again form a material in extruder 14.

It will be easily appreciated that the polyamide layer 24 may be of considerably less weight than the polypropylene net of the carrier layer 22 since the high-melt-strength of the polypropylene serves to support the layer 24. It is this feature which allows the formation of a relatively thin net product from the polyamides. It will be further appreciated that because of the high-melt-strength polypropylene layer, there is no requirement that the layer 24 have any particular melt strength.

EXAMPLE 1

A fiber grade polypropylene resin with a 1.0–2.0 melt flow rate and a density of 0.903 gms/cm$^3$ was extruded from the primary extruder. An adhesive grade polyamide terpolymer of nylon 6, nylon 6/6 and nylon 12 with a 115°–125° C. melting point and a density of 1.08 gms/cm$^3$ was extruded from the secondary extruder of a co-extrusion die. With the 2½-inch diameter primary extruder running at 35 rpm and the 1-inch diameter secondary at 100 rpm, and with a 37-inch diameter mandrel and a line speed of 10 fpm, the polypropylene resin formed a net layer varying between 13 to 18 mils in thickness while the polyamide layer varied between 2–3 mils. The polyamide net easily delaminates from the polypropylene carrier.

EXAMPLE 2

A fiber grade polypropylene resin with a 1.0–2.0 melt flow rate and a density of 0.903 gms/cm$^3$ was extruded from the primary extruder and an adhesive grade linear copolyester (Eastman's FA 9393) with a melting point of 128° C. and a density of 1.24 gms/cm$^3$ was extruded from the secondary extruder of a co-extrusion die. The 2½-inch diameter primary extruder was run at 35 rpm and the secondary 1-inch diameter extruder was run at 110 rpm. A 37-inch mandrel with a line speed of 10 fpm resulted in a polypropylene layer approximately 10–15 mils thick while the polyester formed a layer 5 mils thick on the polypropylene layer. The composite net delaminates easily.

EXAMPLE 3

A low-density polyethylene resin with a 0.5 melt flow rate and a density of 0.918 gms/cm$^3$ was extruded from the primary extruder. An adhesive grade polyamide terpolymer of nylon 6, nylon 6/6 and nylon 12 resin with a 110°–120° C. melting point and a density of 1.02 gms/cm$^3$ was extruded from the secondary extruder of a co-extrusion die. With the 2½-inch diameter primary extruder running at 37 rpm and the 1-inch diameter secondary at maximum and a 37-inch mandrel with a line speed of 13 fpm, the low density polyethylene resin formed a net layer varying between 9–11 mils in thickness while the polyamide layer varied between 1–2 mils. The polyamide net easily delaminates from the low density polyethylene carrier.

It has been found that the striker teeth may drag through layer 24 between the openings in the net. This drag may become objectionable with some resins because it tends to create weaknesses between the openings of the net. If aesthetic appearances are important, it is desirable that this be avoided. Similarly, if a particular resin tends to have greater tendency to stick to the die it should also be avoided. To accomplish this, another embodiment of the method has been found which provides satisfactory net.

In this alternate method, a net composite is formed by tri-extrusion of stable high-melt-strength layers, preferably polypropylene, on either side of the low-melt-strength resin to sandwich the low-melt-strength resin therebetween.

FIG. 2 shows a composite flat net 32 after it has been tri-extruded and slit in conventional manner. The outer layers 34 and 36 of polypropylene are stripped from the middle layer of low-melt-strength resin 38 in similar fashion as was described in the previous method and wound onto rolls 40, 42 and 44. Thus, in accordance with this alternate method three individual layers are produced for sale with only the one process step.

In the above described method two high-melt-strength layers and one low-melt-strength layer are produced in the single extrusion step to reduce striker-teeth drag or the tendency of the resin to stick to the die. It will be appreciated that some low-melt-strength resins will not exhibit these problems. In such cases it is advantageous to encapsulate the carrier high-melt-strength resin between two layers of low-melt-strength polymer since the low-melt-strength net typically has a greater sales value than the high-melt-strength layer. It will be appreciated that the process flow would be exactly that illustrated in FIG. 2 except that in this embodiment the low and high-melt-strength layers and their respective thicknesses are interchanged.

It will be understood that the claims are intended to cover all changes and modifications of the preferred embodiments of the invention, herein chosen for the purpose of illustration which do not constitute departures from the scope and spirit of the invention.

What is claimed is:

1. A method of manufacturing a net product comprising the steps of extruding a first polymer net layer and simultaneously extruding in contact with the first net layer a second polymer net layer of different polymer than said first polymer net layer, said first and second net layers being extruded so that strands of each are in register with one another so as to form a composite net structure thereof, said first polymer net layer being weakly bonded to said second polymer net layer, and subsequently delaminating the first polymer net layer from the second polymer net layer before orienting the structure for forming a net structure of each polymer layer.

2. A method of manufacturing a net product comprising the steps of extruding a first net layer comprising a low-melt strength polymer and simultaneously extruding a second net layer in contact with said first net layer, said second net layer comprising a higher-melt strength polymer, said first net layer being extruded to be in register with and being carried by said second net layer so as to form a composite structure therewith, the first-net-layer polymer being weakly bonded to said second-net-layer polymer, and subsequently delaminating the first net layer from the second net layer prior to orienting for forming a net structure of said low-melt strength polymer.

3. The method of claim 2 wherein said low-melt-strength polymer is chosen from the group consisting of polyamides, polycaprolactones, polyesters, and co-polymers of this group.

4. The method of claim 2 or 3 wherein said higher-melt-strength polymer is a polyolefin.

5. The method of claim 2 or 3 wherein said higher-melt-strength polymer is chosen from the group consisting of polypropylene, high-density polyethylene, low-density polyethylene, linear low density polyethylene, and co-polymers of this group.

6. The method of claim 2 wherein the composite net structure is stored for a predetermined length of time prior to the delaminating step.

7. A method of manufacturing a polyamide net product comprising the steps of co-extruding a composite net which includes a first layer consisting of a polyamide net structure and a second layer comprising a polypropylene net structure and delaminating said first layer from said second layer of the unoriented composite net structure for forming a unitary net structure of polyamide.

8. The method of manufacturing a fusible net product comprising the steps of tri-extruding a composite net material, said composite net material including a low-melt-strength polymer sandwiched between a first outer net layer comprising a polymer having a relatively higher melt-strength than said low-melt-strength middle layer polymer and a second outer net layer comprising a polymer of higher melt strength than said middle layer polymer, said low-melt-strength middle layer polymer being weakly bonded between said outer net layer polymers, and delaminating said outer net layers from the previously sandwiched middle layer for forming a unitary net of said low-melt-strength middle layer polymer.

9. A method of manufacturing a fusible net product comprising the steps of tri-extruding a composite net material, said composite net material including a high-melt-strength polymer sandwiched between a first outer net layer comprising a polymer having a relatively lower melt-strength than said high-melt-strength middle layer polymer and a second outer net layer comprising a polymer of lower-melt strength than said middle layer polymer, said high-melt-strength middle layer polymer being weakly bonded between said outer net layer polymers, and thereafter delaminating said outer net layers from the previously sandwiched middle layer for forming unitary nets of the outer layer polymers.

10. A low-melt-strength light-weight net product produced in accordance with the method of claim 2.

11. A relatively lower-melt-strength net product produced in accordance with claim 9.

12. A composite net product comprising a first net layer consisting of a fusible polymer weakly bonded with a net layer consisting of polypropylene for ease of delamination therefrom, said fusible polymer being chosen from the group consisting of polyamides, polycaprolactones, polyesters and co-polymers of this group.

13. A composite net product comprising a first net layer of low-melt-strength polymer in register with a co-extruded second net layer of higher melt-strength polymer, said polymer layers being weakly bonded polymer layers for ease of delamination.

14. A composite net product comprising a first extruded outer net layer of relatively high melt-strength, a second extruded outer net layer also of relatively high melt-strength, and an extruded middle net layer sandwiched between said first and second net layers, said middle layer being of relatively low-melt-strength, the polymer of said middle layer being weakly bonded to the polymers of said outer layers whereby the composite net product may be easily delaminated into respective unitary net structures.

15. The composite net product of claim 14 wherein said first and second outer layers are polypropylene and said middle layer is chosen from the group consisting of polyamides, polycaprolactones, polyester and copolymers of this group.

16. A composite net product comprising a first extruded outer net layer of relatively low melt-strength, a second extruded outer net layer also of relatively low melt-strength, and an extruded middle layer sandwiched between said first and second net layers, said middle layer being of relatively high melt-strength, the polymer of said middle layer being weakly bonded to the polymers of said outer layers whereby the composite net product may be easily delaminated into respective unitary net structures.

* * * * *